R. W. BORCHARD.
METHOD OF AND APPARATUS FOR FORMING MOLDED HOLLOW ARTICLES.
APPLICATION FILED DEC. 10, 1914.

1,377,304.

Patented May 10, 1921.
2 SHEETS—SHEET 2.

UNITED STATES PATENT OFFICE.

ROBERT W. BORCHARD, OF MILWAUKEE, WISCONSIN, ASSIGNOR OF ONE-HALF TO JOHN J. KANE, OF MILWAUKEE, WISCONSIN.

METHOD OF AND APPARATUS FOR FORMING MOLDED HOLLOW ARTICLES.

1,377,304.

Specification of Letters Patent.

Patented May 10, 1921.

Application filed December 10, 1914. Serial No. 876,585.

*To all whom it may concern:*

Be it known that I, ROBERT W. BORCHARD, a citizen of the United States, residing at Milwaukee, in the county of Milwaukee and State of Wisconsin, have invented certain new and useful Improvements in Methods of and Apparatus for Forming Molded Hollow Articles, of which the following is a full, clear, and exact specification.

This invention relates in general to apparatus for and a method of forming articles molded from a plastic or liquid mass and has particular relation to a method and apparatus of this character, such as are adapted for forming baked hollow articles, as of pastry or confections, especially such articles as are intended for the reception of edibles in a liquid or plastic form.

In the usual apparatus of this general character for producing baked hollow articles of pastry and the like, especially such articles as are intended for the reception of ice-cream and are known as ice-cream cones, raw material, generally in the form of a plastic or semi-liquid batter, is applied to a hollow mold, and a core is inserted in the mold to properly dispose and distribute the batter therein to impart thereto the desired shape, heat being then applied to the material, until the same is sufficiently baked, at which time the source of heat is removed and the baked article is removed from the mold and core.

It is an object of this invention to provide improved apparatus for producing molded articles.

It is a further object of this invention to provide improved apparatus for producing molded hollow articles, wherein a core is removable from its mold with the finished article adhering to the core.

It is a further object of this invention to provide improved apparatus for producing baked hollow articles, which apparatus is automatic in operation.

It is a further object of this invention to provide a novel method of producing molded hollow articles.

These and other objects are attained by this invention, the various novel features of which will appear from the description and drawings, disclosing one embodiment of such invention, and will be particularly pointed out in the claims.

In the embodiment of the invention disclosed, which may be considered as an apparatus for producing baked hollow articles, such as are suitable for the reception of ice-cream, confections, etc., a supporting element or member 10 is secured to a pedestal or shaft 11, preferably fixed in position, against movement thereon, as by detent screws 12, which pass through a hub portion 13 of the element 10. The hub portion 13, which fits about said shaft or pedestal, is provided with a radial flange or shelf 14, provided near its periphery with a downwardly extending supporting flange 15. Strengthening ribs 16 may be provided between the hub portion 13 and the radially extending flange 14. The hub 13 and the flange 15 may form the points of support for the member 10 and the shaft or pedestal 11 to which it is attached. Obviously, the shaft or pedestal 11 may, itself, be supported as on a floor or table, in which case the member 10 may rest on a shoulder of the pedestal.

A frame or carrier 17 is rotatably mounted on the shaft or pedestal 11 above the hub portion 13 of the member 10. This frame 17 may comprise a hub portion 18, rotatably fitting the shaft 11, and a cylindrical element 19, spaced from and secured to the hub portion 18, as through spokes 21. Upward movement of the frame or carrier may be limited by engagement of the hub portion 18 with a collar 22 secured to the shaft 11.

Secured to the radially outer side of the cylindrical portion 19 are a plurality of elements 23 equally spaced about the portion 19 and preferably immediately adjacent to each other. Any securing means suitable for the purpose may be used, the securing means shown comprising screws 24. Each of the elements 23 comprises a body portion 25 with which the securing screws 24 engage, an outwardly extending portion 26 provided with a pocket or mold 27, of cone or other suitable shape, and having a slightly enlarged mouth, as indicated at 28 in Figs. 7 and 8, and an extension 29 from the upper end of the portion 25. This extension 29 comprises a framework including spaced lower and upper portions 30 and 31, respectively, and two spaced connecting side portions 32, the arrangement being such as to leave open the greater part of the extension 29. While the elements 23 are described as being separate and secured individually to the portion 19, it will be obvious that in so far as the general features of this invention are concerned, these elements may be formed integral with the carrier 17.

Figures 2, 3, 4, 5, 6, 7, 8:
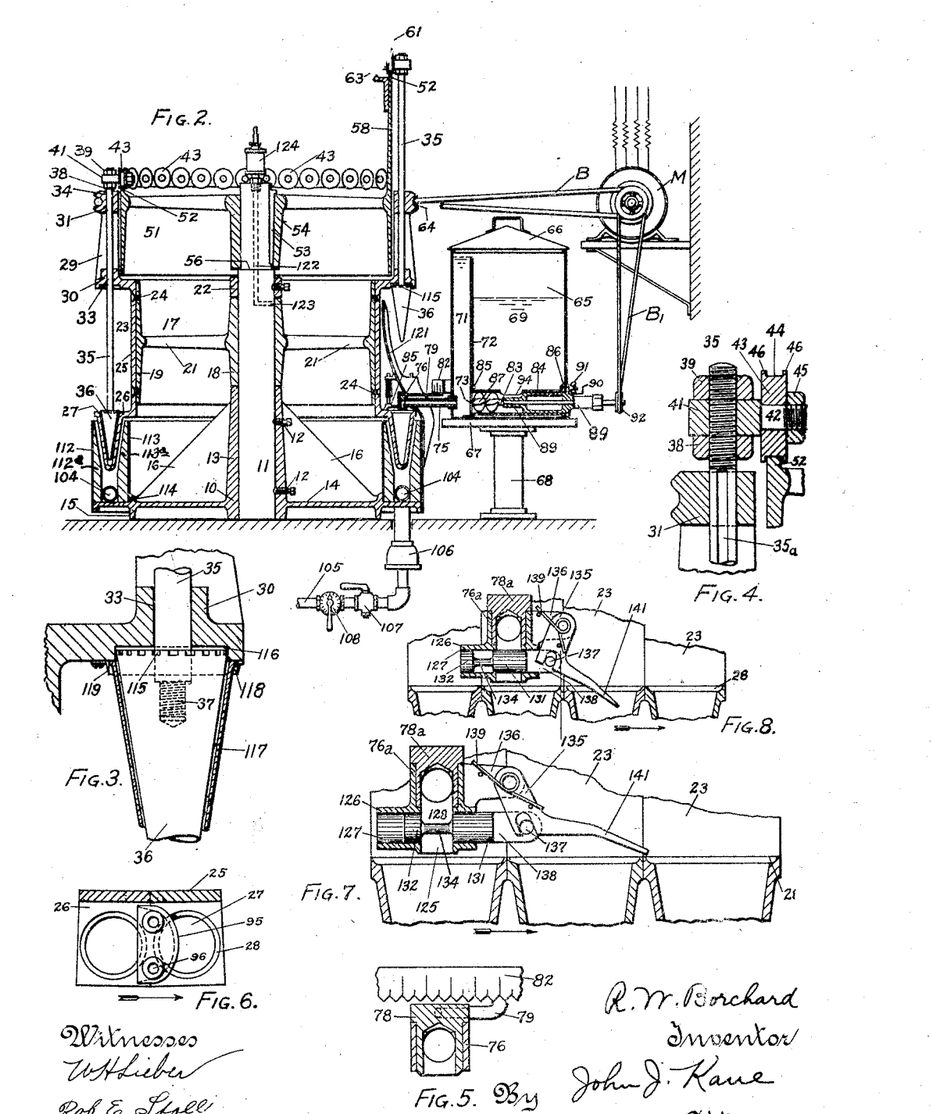
Fig. 2 is a vertical sectional view, on a reduced scale, of the apparatus shown in Fig. 1, with a batter feeding device shown in section.
Figs. 3, 4 and 5 are broken sectional elevations on an enlarged scale, of details of the apparatus shown in Figs. 1 and 2.
Fig. 6 is a broken sectional plan, on an enlarged scale, of a detail of the apparatus shown in Figs. 1 and 2.
Figs. 7 and 8 are sectional elevations, on an enlarged scale, of a portion of a modified form of batter feeding device.

The portions 30 and 31 are provided with alined openings 33 and 34, respectively, the axes of these openings being also in alinement with the axes of the corresponding cone-shaped molds 27. Mounted for reciprocation in the openings 33 and 34 is a rod 35, provided at its lower end with a cone-shaped portion 36 adapted to be inserted, as a core, in the mold 27. The rod 35 may be held against rotation, as by a key in the part 31 which engages in a recess 35$_a$ in the rod 35. The rod 35 may be secured to the core portion 36 as by having a threaded end portion 37 secured in a threaded recess of the core, as indicated in Fig. 3.

The upper end of each rod 35 is threaded to receive nuts 38 and 39, between which is held a support 41 for the bearing or spindle 42 of the roller 43. This roller may be held so as to permit rotation on its bearing in any suitable manner, being here shown as held loosely in position against a shoulder on the support 41 by a nut 45 on the threaded end of the spindle 42. The outer periphery of the roller 43 is provided with a groove 44 bounded by the flanges 46. Secured to the shaft or pedestal 11 is a cylindrical member 51 provided on its upper surface with a guiding portion 52 adapted to enter the groove 44 in the roller 43 attached to the upper end of each rod 35. The member 51 is held against rotation, as by means of a key 53 inserted in alined slots in the shaft 11 and a hub portion 54 with which the member 51 is provided. The member 51 may be held against downward movement by engagement of the lower end of the hub portion 54 with a shoulder 56 on the shaft 11. It will be apparent that the downward movement of the cores in their respective molds is limited by the engagement of the rollers 43 with the guiding edge 52 of the member 51, and, further, that the position of any core relative to its corresponding mold may, at any time, be varied by adjusting the nuts 38 and 39 which hold the bearing support 41 in position.

Since, during the greater portion of the rotation of the carrier frame 17, the cores 36 occupy positions in the molds 27, the greater part of the guiding portion 52 is in the same horizontal plane. To provide for the removal of the cores from their respective molds during a certain part of the rotation of the frame 17, the guiding portion 52 is extended to form a cam-like projection 58. The inclination of the forward side 59 of this cam portion 58 is such as to fully remove the cores from the molds and move them to their uppermost position in a comparatively small angular space. It is preferable that the incline of the forward side 59 of the cam, i. e., the portion that causes removal of the cores from the molds, be less than the inclination on the rear side 60, i. e., the portion during the movement along which the cores are inserted in the molds. To insure descent of the rods 35 and attached cores 36 at the proper point, a cam guard 61, having a guide portion on its lower side adapted to fit the groove 44 of the rollers 43, is suitably held in such position that, the rollers having entered beneath the same, due to the rotation of the frame 17, further angular movement of the frame causes the rollers to be forced downwardly through engagement with the cam guard 61. By suitably inclining the rear side 60 of the cam portion 58, the angular distance traveled by the cores and rods during the descent of the cores to their positions in the molds may be comparatively small. A convenient arrangement of the cam guard 61 is one in which this part is made in a single piece with its support, the latter being in the form of a bent-over portion 63 which is suitably secured to the cam portion 58.

The frame 17 carrying the molds and coöperating cores may be rotated in any suitable manner, as by a belt B operating in a grooved portion 64 of the portions 31. The carrier may be driven through this belt, either directly or through an intermediate pulley, by a motor M.

To provide for the feeding of batter or other plastic or semi-liquid material to the molds, a receptacle 65, having a removable cover 66, is provided. This receptacle may be supported on a table 67, in turn supported by a pedestal 68 which may rest on the same support as the member 10, or may be otherwise supported in any convenient manner. The receptacle 65 is divided into two compartments 69 and 71 by a vertical partition 72, secured to the side walls of the receptacle, connection between the two compartments being afforded through an opening 73 at the lower part of the partition 72. This partition preferably extends upward to a point slightly below the top edge of the sides of the receptacle 65. While the batter feeding device is here shown as comprising a single receptacle divided into two compartments, it will be obvious that, in so far as certain features of the invention are concerned, two separate receptacles may be provided, one being supplied from the other through a communicating passage.

In the side wall of the compartment 71, a spout 75 is secured, the same being provided with a discharge head 76. As shown in Figs. 2 and 5, the effective size of the discharge opening in the head 76 may be regulated by a plug cock 78. To provide for the proper manipulation of the cock 78, a controlling handle 79 is provided, the end of this handle moving across a calibrated scale 82, preferably secured in position by attachment to the receptacle 65. The center of the discharge spout 76 is disposed directly above the line of centers of the molds 27.

To maintain a uniform head on the batter or other material discharged from the spout 75, a pump 83 is provided, the same acting to force material from the compartment 69 to the compartment 71 to keep the level of the material in the latter compartment at the upper edge of the partition 72.

The pump 83 is preferably of a type permitting removal from the receptacle for facility in cleaning and repairing. The pump comprises a tubular casing 84 secured in position adjacent the bottom of the compartment 69, as by being attached to the partition 72 and the wall of the receptacle 65 through flanges 85 and 86. The rotary member 87 of the pump fits rather closely in the tube 84, the shaft of the same being supported in a bearing 89 held in position within the tube 84, as through the use of bolts passing through the flange 90 and into the wall of the receptacle 65, and wing nuts 91 which permit ready removal of the pump rotor supported thereby. This bearing 89 may be in the form of a single solid piece or may comprise two spaced bearing portions connected by ribs or otherwise, as shown in Fig. 2. The rotor shaft is suitably packed in the bearing 89 and held against relative longitudinal movement therein in any convenient manner. The pump is driven in any suitable manner and at any suitable speed, the driving means shown comprising the motor M which drives a pulley 92 on the pump rotor shaft through a belt $B_1$.

Material with which the molds are charged passes from the compartment 69 to the rotary member of the pump through an opening 94 in the casing 84, and is forced into compartment 71. The speed of the pump is such as is sufficient to maintain the level of the material within the compartment 71 at the desired point, the excess material supplied to this compartment overflowing into compartment 69. It will be obvious that the partition 72 may be provided with an opening controlled by a gate so as to regulate the level to be maintained in the compartment 71.

In order to maintain the upper surface of the mold carrying portions 26, adjacent the open ends of the molds 27, free from particles of batter or other material that may drop thereon, so as to prevent the passage of such particles to a point where they may be subjected to such heat as would cause baking of the same, means are provided for removing any such material before the same has an opportunity to become heated to any extent. This means consists of a wiper 95, of leather, fiber or other suitable material, preferably of some flexibility or of rigid material and having a flexible wiping edge. This wiper is preferably held in position through the engagement, in one or more recesses in the upper side thereof, of the lower end of one or more rods 96 which may be guided in their movement by passing through guide openings in members 97 and 98 suitably secured in fixed position. A compression spring 99, disposed between one of said guiding members 97 and an abutment 101 on the rod 96, serves to resiliently urge the wiper 95 into efficient wiping contact with the portions 26. The effective wiping edge of the part 95 is preferably of generally semi-circular or V-shape, the smaller end extending in the direction of movement of the molds. With this arrangement, any material that may drop on the upper surface of the portions 26 is drawn toward the center line of the molds and is forced into the next adjacent mold as the same advances to a point beneath the wiper. It will be apparent that, by lifting the rods, against the action of the springs 99, from their normal positions, the wiper can be readily removed for cleaning or renewal and replaced in position at any time.

In the apparatus shown, heat is applied to the molds for baking the material therein, through the intermediary of a gas burner 104, of any suitable type, disposed beneath the molds and supported on the outer portion of the radial flange or shelf 14. This burner is supplied from a gas supply through a pipe 105, and an air mixing valve 106. A cut-off valve 107 and a regulating valve 108 may be provided in the gas supply pipe 105.

To confine the heat applied to the molds, cylindrical plates 112 and 113 are mounted in such a position that they practically wholly inclose the gas burner and the molds. The plate 112 is held in position as by being bolted or otherwise secured to the outer periphery of the flange or shelf 14; and the plate 113 is held in position as by being secured to a flange 114 on the upper side of the shelf 14. To reduce radiation, these plates 112 and 113, may be lined with some suitable heat insulating material, as indicated at $112_a$ and $113_a$, respectively. The plates 112 and 113 and the outer portion of the flange or shelf portion 14 constitute, as it were, an oven within which the molds are confined. The arrangement of fuel openings in the burner 104 may be such that there is no effective transfer of heat to the molds during that part of the travel of the carrier in which the cores are being lifted from the molds and are being replaced therein.

In the intended operation of the apparatus described, the hollow articles that are baked in the molds 27 are removed therefrom during the operation of lifting the cores 36 from the corresponding molds. To secure such operation, the outer side of each core, adjacent its upper edge, as shown in Fig. 3, is provided with a plurality of recesses or indentations 115, the same being intended for the reception of batter or other material when the core is inserted in the mold, the material baking in the recesses and thus forming keys which serve to attach the baked hollow articles to the core, so that such articles may be conveniently withdrawn with the core. During the latter portion of the upward travel of the core, the upper end thereof enters a recess 116 in the lower face of the portion 30, the recess being of such size that the upper edge of the core has a comparatively close fit therein. As the attached baked article, as indicated at 117, moves upward, prior to the entrance of the upper end of the core into the recess 116, the upper enlarged end of the baked article, which is in the form of a bead 118 and consists of that portion of the article that occupied the enlargement or recess 28 at the open end of the mold, engages the shoulder formed on the portion 30 about the recess 116 and is held thereby against further movement, although the core, itself, continues its upward movement, thus causing a stripping of the baked article from the core, the baked material in the recesses 115 being severed and the cone dropping away.

To insure that the outer periphery of the open end of the baked article is comparatively clean and even, the same is trimmed through engagement with an annular cutter 119 secured in position on the under side of the portion 30 about the recess 116. This cutter is so positioned that the open end of the baked article is forced against and through the cutter just prior to the engagement of this end of baked article with the shoulder on the portion 30 surrounding the recess 116. This operation removes any adhering baked or partially baked material, and produces a clean outer edge at the open side of the baked article.

To facilitate the removal of the baked articles to a point where the same can be properly handled, a guide way 121 is secured in position adjacent the point in the travel of the rotating carrier 17 at which the baked articles are removed from the several cores. This carrier may be secured in position in any suitable manner, as for instance as by being screwed or bolted to the plate 112. The carrier is of such shape and so disposed that it receives the baked articles as they drop from the cores, conveying the same outside the circle of molds to a point at which these baked articles can be expeditiously collected. In the apparatus shown, the guide way 121 serves as a support for the wiping device 95 and its appurtenant parts.

It is to be noted that the batter feeding spout 75, the guide way 121 for the baked articles and the wiper 95 are all so disposed that each mold passes thereunder successively during its travel. Again, these parts are so disposed that the cores are removed from their respective molds prior to the passage of such molds beneath these parts, the result being that there is no interference between the reciprocating cores and the batter supplying spout, the guide way and the wiper.

In case it may be desirable, means may be provided for lubricating the cores and molds to insure the ready removal of the baked articles therefrom and to avoid any tendency to sticking, although, in the preferred form, the material of the cores and molds is aluminum or an alloy thereof which is self-lubricating to the extent that the baked articles may be readily removed from these parts.

The rotating carrier may be lubricated in any suitable manner. In the present instance, the shaft or pedestal 11 is provided with a central bore 122 and one or more radial bores 123 communicating therewith at its lower end and with the bearing surfaces of the pedestal 11 and the hub portion 18 of the carrier 17. These bores convey lubricating fluid from a receptacle 124 held in position on the pedestal at the upper end of the bore 122.

Figure 1:
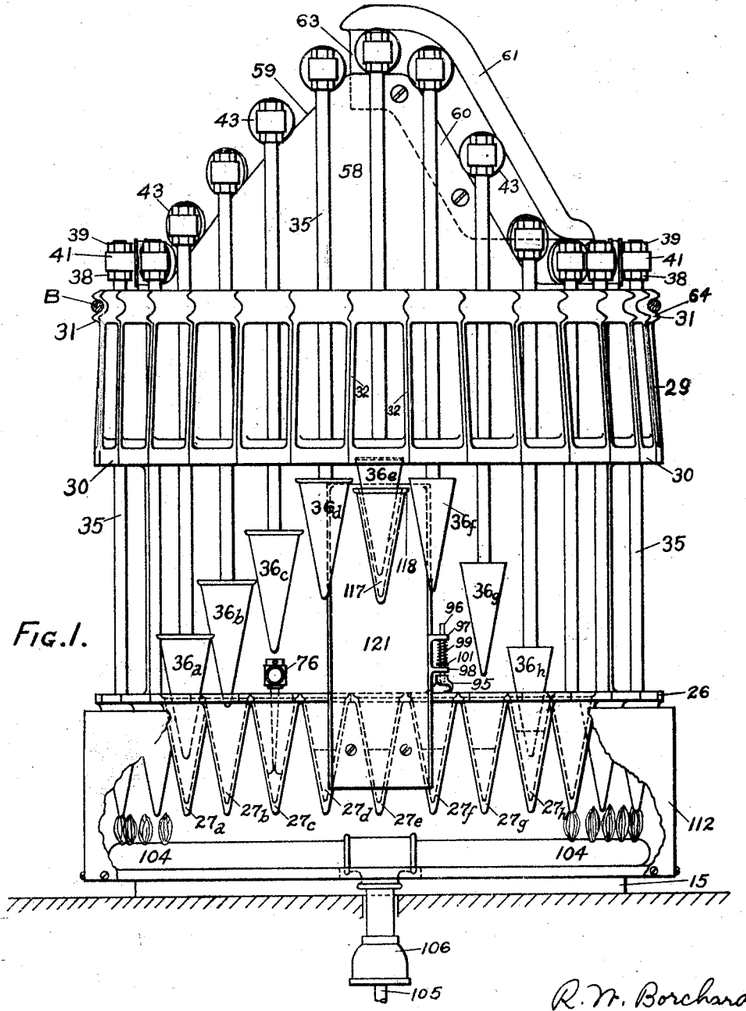
Figure 1 is a view in elevation of apparatus embodying features of this invention, a portion being broken away.

In the ordinary operation of the apparatus described, the carrier 17, supporting the molds and cores, is rotated at a suitable speed by the motor M, as is also the pump 83 which serves to convey the batter from the compartment 69 to the compartment 71 of the receptacle 65. As has been described, during the operation of the apparatus, the cores which are in place in their respective molds during the baking part of the operation are moved out of the molds when the rollers 43 attached to the core supporting rods 35 come under the effect of the front edge 59 of the cam portion 58. Considering Fig. 1, it will be seen that when a mold and its corresponding core come into the position occupied by core $36_a$ and mold $27_a$, the corresponding roller 43, attached to the rod 35, will have begun its travel upward on the cam portion 59. As will be apparent, this action causes a removal of the core from the mold, the material which has been baked through a previous passage through the heating oven remaining in position on the core, being attached thereto through the action of particles of baked material forming keys which occupy the recesses 115 at the upper edge of the core. The core will have been almost wholly removed from its mold, when the parts are in the position occupied by core $36_b$ and mold $27_b$, and will be fully removed therefrom when the parts are in the position occupied by core $36_c$ and mold $27_c$.

As the batter feeding spout 75 is so positioned relatively to the revolving cores and molds as to occasion no interference with the cores, each core being removed some distance from its mold at the time such mold passes beneath the spout, it will be apparent, that, when a core and mold are in the position occupied by core $36_c$ and mold $27_c$, the mold is in position to receive batter from the spout 75. This feeding of batter begins when the forward edge of the mold comes beneath the spout and continues until the rear edge passes from beneath the spout. This feeding is preferably continuous, one mold after another passing beneath the spout to receive its proper charge of batter, and the rate of discharge of batter being such that the proper amount is discharged in the mold during the interval elapsing during the passage of the mold beneath the spout.

As the core and mold continue their movement beyond the position occupied by core $36_d$ and corresponding mold $27_d$ and into the position occupied by core $36_e$ and corresponding mold $27_e$, the upper edge of the core and attached baked article 117 are moved to a position adjacent the lower side of the portion 30. As the core and baked article continue their upward movement, the upper beaded edge of the baked article passes within the annular cutter 119, the same acting to sever any attached particles of baked material and to leave the edge of this beaded portion clean and even. Further upward movement of the parts causes the upper edge of the core to enter the recess 116 in the part 30. At the moment the upper edge of the core enters this recess, the upper edge of the beaded portion on baked article abuts against the shoulder surrounding the recess 116, continued upward movement of the core causing the stripping of the baked article from the core. This stripping action is necessarily attained through a severing of the keys of baked material occupying the recesses 115 at the upper edge of the core. The baked article, being separated from the core, drops and is caught by the guide 121 which occupies a position as indicated in Fig. 2.

As the core advanced to the position occupied by the core $36_e$, the roller 43 attached thereto passed under the guiding cam 61. On the continued movement of the core, the roller 43 is forced downward, along the rear edge 60 of the cam portion 58, toward its mold. It will be apparent that the mold, after passing from the position occupied by mold $27_e$, and as it passes into the position occupied by mold $27_f$, passes beneath the wiper 95, the latter serving to clean the surface of the mold carrier portion 26 and remove any excess batter therefrom. As the core and mold advance beyond the wiper 95 and into the position occupied by core $36_g$ and mold $27_g$, the core is about to enter the mold, and, on further advancement, the core enters the mold, as indicated by the relative positions of the core $36_h$ and the mold $27_h$. On further movement of the parts, the attached roller 43 again reaches the general plane of the guiding edge 52 of the member 51, at which time the core is fully immersed in the mold, the core acting to distribute the batter in the mold so that it completely fills the space between the core and mold.

As the core and mold advance, the mold comes under the influence of the effective portion of the heating burner 104, and the baking process begins. The core and mold continue under the influence of the heating burner 104 until they again arrive at a position wherein the engagement of the roller 43, associated with the core, and the forward edge 59 of the cam portion 58 causes an upward movement of the core out of its mold.

It will be obvious that these operations of removing the cores from the molds, charging the molds with batter, stripping the baked articles from the cores, wiping the upper surface of the mold-carrying portions, and the reinsertion of the cores in the batter-containing molds, are continuous. It will be apparent that the speed of the operation of the apparatus may be so regulated that the finished product is baked to the proper degree at the time the parts come into such position that the cores and attached baked articles are removed from the molds.

During the operation of the apparatus, the pump 83 continues to feed batter from the compartment 69 to the compartment 71 to maintain a constant head on the discharge spout 75, to the end that the quantity of batter discharged in equal intervals of time will be the same. It will be apparent that the receptacle 65 may be refilled at any time without interfering with the operation of the apparatus.

While, in the form of apparatus described, the batter is fed continuously through the discharge head 76 of the spout 75, the flow of batter being so limited that each mold receives a proper amount during its passage beneath the spout, the wiper 95 taking off any excess material, it will be obvious that the present arrangement is capable of modification to the extent that the batter may be discharged only during a certain portion of the interval during which each mold is beneath the spout. It will be apparent that, with such an arrangement, there may be less liability of overflowing or spilling excess batter along the upper edges of the molds.

If desired, recesses 115 adjacent the upper edge of the core, which are occupied by attaching keys of baked material to hold the baked article on the core, may be of such shape as to permit the particles occupying such recesses to drop or slide out on the removal of the baked article; or, as may be preferable, the recesses may be of such shape as to hold their particles of baked material, when the article is removed, the roughened exposed surfaces of which cause the material of the next article baked on the same core to adhere thereto until the core is moved to article-removing position. Again, as has been found an effective arrangement, the surface of the mold may be roughened, as by nurling, at one or several points, particles of baked material occupying the small recesses formed and acting to hold the article on the core, these particles being either removed on the removal of the article from the core or remaining in position to present roughened surfaces to which the material of the next article baked on such core adheres.

In accordance with the disclosure of the modification shown in Figs. 7 and 8, the discharge head 76$_a$ is provided with a regulating cock 78$_a$ having a passage communicating with the spout 75 which can be regulated as to its effective discharge size. The lower end of the discharge head 76$_a$ has a bore 125 in alinement with the bore of the cock 78$_a$, and is provided with a valve casing 126 having a bore 127 at right angles to the bore 125. The valve 128, here shown as being of the piston type, is slidable in the bore 127 and consists of a body portion 131 and a guiding portion 132, a portion 134 intermediate the portions 131 and 132 being recessed so that, when this latter portion is in alinement with the bore 125, there is comparatively no impedance to the flow of material through the bore 125. An arm 135 is pivoted to an extension 136 from the discharge head 76$_a$ and has a pin and slot connection, through the pin 137, with an end portion 138 on the valve 128. A spring 139 on the pivot of the arm 135 is held in effective position through the action of suitable stops on the arm 135 and the extension 136, and serves to resiliently urge the valve 128 into such position that the body portion 131 obstructs the bore 125 of the discharge head 76$_a$. The arm 135 is provided with a cam extension 141 which is engaged by the rear edge of each mold as it advances. Through this engagement of the several molds with this cam extension, the valve 128 is actuated against the bias of the spring 139 to a position in which the recessed portion 134 comes into alinement with the bore 125, permitting the discharge of batter to that mold which is at the time beneath the discharge head. The cam extension 141 is of such shape that the full opening and closing movements of the valve occur at a time when the mold is in such a position beneath the spout that the full charge of batter may be received therein without any danger of spilling the same along the edges of the mold. As the mold advances, the end of the extension 141 rides free of the rear edge of the mold with which it has been in engagement, and the spring 139 throws the extension to normal position and the valve 128 into such position as to obstruct the discharge head 76$_a$. The valve and extension remain in these latter positions until the next mold has come beneath the spout and the rear edge of another mold has come into engagement with the extension 141 at which time the valve opening and closing operations are repeated.

It will be apparent that, if desired, the valve operating mechanism may be so modified that the valve will be operated through the actuation of the cam extension 141 by the rear edge of the mold immediately preceding the one to be charged with batter.

It should be understood that it is not desired to be limited to the exact details of construction shown and described, for obvious modifications will occur to a person skilled in the art.

It is claimed and desired to secure by Letters Patent:

1. In combination, a support, a mold carried thereby and maintained continuously with its open end upward, a core automatically movable into and out of said mold, and means associated with said support and effective on the removal of said core from within said mold to automatically cause the removal from said core of a molded article that may adhere thereto and be removed therewith from within said mold.

2. In an apparatus for producing molded hollow articles, a mold, a core automatically alternately insertible in said mold to shape an article and removable from said mold upon complete formation of said article, said core and said mold being maintained with their axes substantially parallel to each other during said inserting and removing operations, and said core being formed to permit a completely formed article to adhere thereto on the removal thereof from within said mold, means for causing the removal of said core from said mold, and means coöperable with said molded article during the same operation of said core which causes removal thereof from within said mold and subsequently to such removal of said core from within said mold for causing the removal of said article from said core.

3. In apparatus for forming baked hollow articles, a movable carrier with a plurality of molds, a series of cores adapted to enter and partially fill said molds, means for automatically and successively removing a core and attached baked article from within its corresponding mold, for introducing material to be baked into said mold, and for removing an attached baked article from said core.

4. In apparatus for forming baked hollow articles, a rotatable carrier provided with a plurality of molds, a series of cores adapted to enter and partially fill said molds, means for automatically and successively removing a core and attached baked article from within its corresponding mold and for removing an attached baked article from said core, said cores being maintained continuously in axial alinement with the corresponding molds, and means for supplying heat to cause the baking of said material when said cores are in position in said molds.

5. In apparatus for forming baked hollow articles, a plurality of molds adapted to receive batter, a series of cores adapted to enter and partially fill said molds, means for automatically and successively removing said cores and baked articles that may adhere thereto from said molds and causing the stripping of said baked articles from said cores, and means for supplying a quantity of batter to said molds while the corresponding cores are separated therefrom.

6. In apparatus for forming baked hollow articles, a plurality of molds adapted to receive batter, a series of cores adapted to enter and partially fill said molds, and means for automatically and successively lifting said cores and baked articles that may adhere thereto from said molds, for supplying a fresh charge of batter to said molds, for removing said baked articles from said cores, for inserting said cores in said molds, and for causing movement of said molds to a position wherein the same are subjected to heat for baking said batter.

7. In combination, a progressively shifting member carrying a plurality of molds, cores adapted to coöperate with said molds, means for causing relative separation of said cores and molds during said shifting movement, means for discharging material into said molds, and means operative subsequent to the discharge of material into said molds to wipe the parts adjacent the mouths of said molds while said cores and molds are separated.

8. In combination, a progressively shifting element carrying a plurality of molds and coöperatively disposed cores, means for causing relative separation of said cores and molds during a portion of the movement of said element, means for discharging material into each of said molds, means operative subsequent to the discharge of material into a mold to remove an article adhering to the core removed from said latter mold and means for subsequently wiping portions adjacent the mouth of said latter mold while said core and mold are separated.

9. A machine for producing baked hollow articles, comprising a support, a series of molds and coöperative cores carried by said support, means for supplying batter to said molds, an oven for supplying heat to bake the batter in said molds, and means for removing said cores and baked articles that may be attached thereto from within said molds and for removing said baked articles from said cores, said machine being continuously operative to automatically and successively remove said cores and baked articles that may be attached thereto from within said molds, to supply batter to said molds, and to remove said baked articles from said cores.

10. A machine for producing baked hollow articles, comprising a movable support, a series of molds and relatively movable coöperative cores carried by said support, means for supplying batter to said molds, an oven for supplying heat to bake the batter in said molds, and means for removing said cores and baked articles that may be attached thereto from within said molds and for removing said baked articles from said cores, said machine being continuously operative to move said molds to a position wherein the batter therein is baked, to remove said cores and baked articles that may be attached thereto from within said molds, to supply batter to said molds, to remove the attached baked articles from said cores, and to reinsert said cores in said molds.

11. In combination, a movable carrier, coöperative cores and molds supported by said carrier, an oven with which said molds are adapted to be associated to cause baking of material within said molds, means for causing the removal of said cores and articles of baked material that may be attached thereto from within said molds, means for charging said molds with material to be baked, means for wiping the parts adjacent the mouths of the molds, and means coöperative with said removing means and operative when said cores are fully removed from said molds to cause the removal of attached baked articles from said cores.

12. In apparatus of the character set forth, a plurality of molds and coöperating cores, said cores being insertible in and removable from said molds, a device for supplying material to said molds and comprising a plurality of compartments and means for forcing said material from one compartment to the other to maintain the level of material in the latter compartment constant and at least as high as that of the material in the first compartment, and a discharge nozzle communicating with the latter compartment and adapted to discharge material into said molds.

13. In apparatus of the character set forth, a carrier supporting coöperating cores and molds, means for causing the removal of said cores from said molds, a device for supplying batter to said molds operative while said cores are removed from said molds to discharge a quantity of material into said molds, said batter supplying device comprising a receiving compartment and a discharge compartment, and means associated with both of said compartments for maintaining a constant head on the batter in said discharge compartment independently of the level of the batter in said receiving compartment.

14. In apparatus of the character set forth, a plurality of coöperative cores and molds, said cores being insertible in and removable from said molds, and a device for supplying material to said molds and comprising a plurality of compartments and means for forcing material from one compartment to the other to maintain the level of material in said latter compartment at least as high as that in the first compartment, said means comprising a pump removably disposed in one of said compartments and having an operative connection located outside said compartment.

15. In apparatus of the character set forth, a plurality of coöperative cores and molds, said cores being insertible in and removable from said molds, means operative when said cores are removed from said molds for supplying batter to said molds, and wiping means subsequently operative to wipe the edge portions of said batter-containing molds, said wiping means comprising a support and a removable part held in operative position through said support and resiliently urged into engagement with the portions to be wiped.

16. In a baking apparatus, a mold adapted to receive batter to be baked, a removable core for said mold adapted to impart to said batter the desired form when in position in said mold, and mechanism for automatically causing the removal of said core and a baked article that may adhere thereto from within said mold and the subsequent removal of said article from said core at a single substantially unidirectional operation of said core.

17. In a baking apparatus, a movable mold adapted to receive batter to form a baked hollow article, a core adapted to enter and partially fill said mold and to give said batter the desired form, means for supplying heat to cause baking of said batter, and means for automatically and at a single unidirectional operation removing said core and a baked article that may adhere thereto from within said mold and effecting removal of said baked article from said core.

18. In apparatus for forming hollow articles from plastic material, a mold, a core insertible in said mold and to which the finished hollow article is adapted to adhere on the removal of said core from within said mold, means for effecting relative movement of said core and said mold and means for trimming the edge of said article at the open end thereof, the operation of said core in the same direction causing the removal of the same and formed article that may be attached thereto from within said mold and the subsequent trimming of said article.

19. In apparatus for forming hollow articles from plastic material, a mold, a core adapted to enter said mold and partially fill the same and to which a hollow article is adapted to adhere on removal of said core from within said mold, means for removing said core and attached article from within said mold, and means subsequently operative upon movement of said core to cause the trimming of said article and the removal thereof from said core, said core and said mold remaining in substantially axial alinement during the trimming of said article and the removal of the same from said core.

20. In apparatus of the character set forth, a plurality of molds, a series of cores insertible in and removable from said molds, means for supplying fluent material to said molds, said means comprising valve means controlling the discharge of said material to said molds, said molds and said supply means being relatively movable, and said valve means comprising a valve-actuating member engageable with the inner surfaces of said molds to cause the discharge of material to said molds.

21. In apparatus for producing baked hollow articles, a mold, a core insertible in and removable from said mold, an element secured to said core, a guide for said element for restraining the movement of said core to the direction of the axis of said mold, means associated with said guide and in the path of movement of a baked article that may adhere to said core on removal thereof from said mold for causing the removal of said baked article from said core.

22. In apparatus for producing baked hollow articles, a mold, a core insertible in and removable from said mold, operating means for said core comprising a rod secured thereto, a member for guiding said rod in its movement, said guide member being provided with portions adapted to successively engage a baked article adhering to said core on its removal from within said mold to trim said article and remove the same from said core.

23. In an apparatus for producing molded hollow articles, a mold, a core insertible in and removable from said mold, an abutment and a trimming device fixed in position relatively to said mold and disposed coaxially therewith, said trimming device being disposed between said abutment and said mold whereby on removal of said core and an article attached thereto from within said mold said article successively engages said trimming device and said abutment to cause said article to be trimmed and removed from said core.

24. In an apparatus for producing molded hollow articles, a mold, a core insertible in and removable from said mold, a trimming device coaxially disposed relatively to said mold and with which a molded article adhering to said core is engageable on removal of said core and said article from within said mold to cause surplus material to be removed from an edge of said article.

25. In an apparatus for producing molded hollow articles, a mold bodily movable in a definite path, a core insertible in and removable from said mold, an abutment with which a molded article adhering to said core coöperates automatically on removal thereof from within said mold to cause removal of said article from said core, said abutment being movable with said mold, and said abutment and said mold occupying substantially the same positions relative to each other throughout the travel of said mold.

26. In apparatus of the character described, a plurality of coöperative cores and molds, and a device for supplying fluent material to said molds, said device comprising a plurality of communicating compartments, and means operative to force material from one compartment to a second compartment to maintain a constant head on the material in said second compartment independently of the level of material in said first compartment.

27. In apparatus of the character described, a plurality of coöperative cores and molds, a device for supplying fluent material under a constant head to said molds, said device comprising a plurality of compartments communicating with each other adjacent their lower ends, and a pump comprising a casing and a rotatable element operative therein associated with one compartment adjacent the lower end thereof, the rotary element of said pump having a driving portion extending outside said compartment and being removable through the wall of said compartment.

28. In apparatus of the character described, a plurality of coöperative cores and molds, and a device for supplying fluent material under a constant pressure to said molds, said device comprising a receptacle, a partition for dividing said receptacle into a plurality of compartments communicating with each other adjacent the lower ends thereof, and means for forcing material from one compartment to another through the communicating passage therebetween, the upper edge of said partition being below the upper edge of the receptacle wall to permit material to overflow from said second compartment to the first whereby the level of material in said second compartment is maintained constant at the upper edge of said partition.

29. In apparatus for forming baked hollow articles, a single-piece mold, a core insertible within said mold, and automatically operative instrumentalities for causing the removal of said core and baked article adhering thereto from within said mold and the subsequent removal of said baked article from said core, said removing operations being effected through a substantially unidirectional movement of said core.

30. In combination, a movable carrier, coöperative cores and open ended molds supported by said carrier, said cores being movable into and out of said molds and said molds being maintained with their open ends upward continuously while said cores are removed therefrom, an oven with which said molds are adapted to be associated to cause baking of material within said molds, means for causing the removal of said cores and articles of baked material that may be attached thereto from said molds, means for charging said molds with material to be baked, and means coöperative with said removing means and operative when said cores and attached baked articles are fully removed from within said molds to cause the removal of said attached baked articles from said cores.

31. In apparatus for forming molded hollow articles, a rotatable carrier, a plurality of coöperative cores and molds supported by said carrier and said molds being maintained continuously with their open ends upward, said cores being insertible in and removable from corresponding molds, means operative to cause the removal of said cores and formed articles that may be attached thereto from within said molds and to cause the subsequent removal of said articles from said cores, and discharge means adapted to receive articles removed from said cores and to convey said articles to a desired point.

32. In apparatus of the character described, a plurality of molds, a device for supplying fluent material to said molds, comprising a plurality of compartments, and means for forcing fluent material from one compartment to the other to maintain the level of material in said latter compartment at least as high as that in said first compartment, said forcing means comprising a pump disposed in one of said compartments, a movable element of said pump extending through a wall of said compartment and affording an operating connection for said pump.

33. In apparatus of the character described, a plurality of molds, a device for supplying fluent material to said molds comprising a supply compartment and a discharge compartment, communication between said compartments being afforded at two spaced points situated at different levels, and means for forcing material from said supply compartment through the communicating passage at the lower level, the communicating passage at the upper level permitting the overflow of material from said discharge compartment to said supply compartment to maintain the level of material in said discharge compartment substantially constant.

34. In apparatus of the character described, a device for supplying fluent material comprising supply and discharge compartments and operative to cause the flow of material from said supply compartment to said discharge compartment and the simultaneous discharge of surplus material from said discharge compartment to said supply compartment to maintain a substantially constant head on the material in said discharge compartment.

35. In apparatus of the character set forth, a plurality of coöperative cores and molds, a carrier for said cores and molds, said cores being insertible in and removable from said molds, means for supplying fluent material to said molds, and means automatically operative during the rotation of said carrier to wipe the edge portions of said molds, said wiping means comprising a wiping element yieldingly engageable with the portions to be wiped.

36. In apparatus for producing baked hollow articles, a coöperative and relatively movable core and mold, said mold being adapted to receive batter and said core imparting the desired shape to said batter, and mechanism for causing the relative separation of said core and said mold while maintaining their axes substantially parallel to each other and the subsequent removal from said core of a baked article that may adhere thereto at a single operation of one of said parts.

37. In an apparatus for producing molded hollow articles, a mold, a core insertible in and removable from said mold, means for constraining the movement of said core into and out of said mold to one wherein the axes of said core and mold are substantially parallel to each other, and means with which a molded article adhering to said core coöperates automatically on removal thereof from within said mold to cause removal of said article from said core.

38. In apparatus for forming baked hollow articles, a mold, a core insertible in and removable from said mold, and means for causing the removal of said core and a baked article that may adhere thereto from within said mold and the subsequent and automatic removal of said baked article from said core while maintaining the core and mold with their axes substantially parallel.

39. An improvement in the art of producing hollow articles that are formed between a coöperative mold and core, which comprises removing the core and a formed article attached thereto from within the mold, and successively trimming and forcing the article from the core, said removing and trimming operations being effected by a continuous relative motion of translation of the core and mold.

40. An improvement in the art of producing hollow articles that are formed between a coöperative core and mold, comprising successively removing a formed article from within the mold while the article is attached to the core, trimming the article while attached to the core, and forcing the article from the core.

41. An apparatus for producing baked hollow articles, comprising a mold adapted to receive material to be baked, a core insertible in said mold to give the material the desired shape and removable from said mold, and instrumentalities operative to automatically and successively cause material to be baked to be supplied to said mold, cause the insertion of said core in said mold, cause said mold to be heated to thereby bake the material in said mold, cause the removal from within said mold of said core and a baked article that may adhere thereto, and cause the removal of said baked article from said core.

42. An apparatus for producing baked articles, comprising a mold adapted to receive material to be baked, a core insertible in said mold to give the material the desired shape and removable from said mold, and instrumentalities operative to cause the removal from within said mold of said core and a baked article that may be attached thereto, and to subsequently and automatically cause the removal of said baked article from said core while maintaining said core and mold in substantially axial alinement.

43. In apparatus for forming baked hollow articles, a mold, a core coöperative therewith to give the desired shape to an article in said mold, and instrumentalities operative to cause separation between said mold and its coöperative core and an article that may adhere thereto so as to cause complete removal of said article from said mold, and to subsequently cause removal of said article from said core while maintaining said core and mold in substantially axial alinement.

44. In apparatus for forming baked hollow articles, a mold, a core coöperative therewith to give the desired shape to an article in said mold, said core and mold being relatively movable, and instrumentalities operative to automatically and successively cause separation between said mold and its coöperative core and a baked article attached thereto so as to cause complete removal of said article from said mold, and removal of said article from said core, said instrumentalities being operative to effect the separation of said mold and core and the removal of said article from said core through substantially unidirectional movement of one of said coöperative parts.

45. An improvement in the art of producing baked hollow articles formed between a mold and a core coöperative therewith, which comprises removing the core and a baked article attached thereto from within the mold and subsequently removing the baked article from said core while maintaining said core and mold continuously in substantially axial alinement.

46. An improvement in the art of producing baked hollow articles that are formed between a mold and a core coöperative therewith, which comprises removing the core and a baked article attached thereto from within the mold, trimming the article, and removing the article from the core while maintaining the core and mold continuously in substantially axial alinement.

47. An improvement in the art of producing baked hollow articles formed between a mold and a core coöperative therewith, which comprises removing the core and a baked article attached thereto from within the mold, and subsequently removing said baked article from said core through a movement of said core that is a continuation of and in substantially the same direction as said core-removing operation.

48. An improvement in the art of producing baked hollow articles formed between a mold and a core coöperative therewith, which comprises separating said core and mold with a baked article adhering to a movable one of said parts, and removing said baked article from said part during a continuation of said separating operation while said parts are maintained continuously in substantially axial alinement.

49. In combination, a support, a mold carried thereby, a core, means for effecting substantially unidirectional relative motion of translation of said mold and said core to shape an article in said mold and to remove said core and the formed article from said mold, and means associated with said support and effective during said motion of translation to automatically remove the article from said core.

50. In apparatus for producing baked hollow articles, a core insertible in and removable from said mold, operating means for said core comprising a carrying element to which said core is attached, means for guiding said carrying element, and means associated with said guiding means and effective to engage a baked article adhering to said core on its removal from within said mold and cause the removal of said article from said core.

51. In apparatus for forming baked hollow articles, an open-ended mold, a core insertible within said mold, and automatically operative instrumentalities for causing removal of said core and a baked article adhering thereto completely from within said mold while maintaining said mold with its open end upward and its axis substantially parallel to that of said core, and for causing the subsequent removal of the baked article from said core.

52. An improvement in the art of producing molded hollow articles formed between a mold and a core coöperative therewith, which comprises removing the core and a molded article attached thereto from within the mold while maintaining the mold with its open end upward and its axis substantially vertical, and subsequently removing the molded article from the core by a movement of said core that is a continuation of and in substantially the same direction as the core removing operation.

In testimony whereof I affix my signature, in the presence of two witnesses.

ROBERT W. BORCHARD.

Witnesses:
W. H. LIEBER,
J. J. KANE.